United States Patent
Nisenblat

(10) Patent No.: US 11,792,110 B2
(45) Date of Patent: Oct. 17, 2023

(54) GEOLOCATION SYSTEM AND METHOD

(71) Applicant: HowTech Pty Ltd, Adelaide (AU)

(72) Inventor: Pol Nisenblat, Blackwood (AU)

(73) Assignee: HowTech Pty Ltd, Adelaide (AU)

( * ) Notice: Subject to any disclaimer, the term of this patent is extended or adjusted under 35 U.S.C. 154(b) by 0 days.

(21) Appl. No.: 17/051,390

(22) PCT Filed: May 1, 2019

(86) PCT No.: PCT/AU2019/000052
§ 371 (c)(1),
(2) Date: Oct. 28, 2020

(87) PCT Pub. No.: WO2019/210349
PCT Pub. Date: Nov. 7, 2019

(65) Prior Publication Data
US 2021/0234790 A1    Jul. 29, 2021

(30) Foreign Application Priority Data

May 1, 2018    (AU) .............................. 2018901459

(51) Int. Cl.
*H04L 45/00*       (2022.01)
*H04L 45/021*      (2022.01)
*H04L 61/5007*     (2022.01)

(52) U.S. Cl.
CPC ............ *H04L 45/14* (2013.01); *H04L 45/021* (2013.01); *H04L 45/22* (2013.01); *H04L 61/5007* (2022.05)

(58) Field of Classification Search
CPC .......................... H04L 61/2007; H04L 61/5007
See application file for complete search history.

(56) References Cited

U.S. PATENT DOCUMENTS

| | | |
|---|---|---|
| 6,757,740 B1 | 6/2004 | Parekh et al. |
| 7,200,658 B2 | 4/2007 | Goeller et al. |
| 8,055,702 B2 | 11/2011 | Lango et al. |
| 8,443,107 B2 | 5/2013 | Burdette et al. |

(Continued)

FOREIGN PATENT DOCUMENTS

| | | |
|---|---|---|
| AU | 2009201049 A1 | 4/2009 |
| WO | WO 2017/015454 A1 | 1/2017 |
| WO | WO 2019/210349 A1 | 11/2019 |

OTHER PUBLICATIONS

Csoma et al.; On Measuring the Geographic Diversity of Internet Routes; arXiv:1601.01116v1 [cs.NI]; Jan. 6, 2016; 7 pgs.

(Continued)

*Primary Examiner* — Andrew C Georgandellis
(74) *Attorney, Agent, or Firm* — Holland & Hart LLP

(57) ABSTRACT

A system and method of obtaining a service area estimation for a router interface is disclosed. In an example, one method for obtaining a service area estimation for a router interface method includes determining hint information for indicating an association between the router interface and geolocation information obtained for one or more IP addresses serviced by the router interface; and processing the hint information to determine the service area estimation for the router interface. A system and method of obtaining a geolocation estimate for a device having an IP address which is serviced by a router interface for which an estimated service area has been obtained is also disclosed.

15 Claims, 13 Drawing Sheets

(56) References Cited

U.S. PATENT DOCUMENTS

| | | | |
|---|---|---|---|
| 8,745,269 | B2 | 6/2014 | Parekh et al. |
| 9,280,750 | B2 | 3/2016 | Prieditis |
| 9,413,712 | B2 | 8/2016 | Anderson et al. |
| 9,729,504 | B2 | 8/2017 | Bartlett |
| 2010/0015995 | A1* | 1/2010 | Caspi ................ G01S 19/46 455/456.1 |
| 2011/0282988 | A1 | 11/2011 | Wang et al. |
| 2013/0031033 | A1 | 1/2013 | Prieditis |
| 2014/0229612 | A1* | 8/2014 | Chandrashekar ....... H04L 41/12 709/224 |
| 2019/0007503 | A1* | 1/2019 | Zmijewski .......... H04L 43/0823 |

OTHER PUBLICATIONS

Hillmann, P. et al., 'On the Path to High Precise IP Geolocation: A Self-Optimizing Model', International Journal of Intelligent Computing Research (IJICR), vol. 7, Issue 1, Mar. 2016, pp. 682-693; Research Center Code (Cyber Defence), Universität der Bundeswehr München, Werner-Heisenberg-Weg 39, 85577 Neubiberg, Germany; 12 pgs.

Wang, T. et al., 'An Optimization Method for the Geolocation Databases of Internet Hosts Based on Machine Learning', Hindawi Publishing Corporation, Mathematical Problems in Engineering, vol. 2015, Article ID 972642, pp. 1-17; 18 pgs.

Nur, A. Y. et al., 'Cross- AS (X- AS) Internet Topology Mapping', Computer Networks, vol. 132, Feb. 26, 2018, pp. 53-67. See the whole document, particularly FIG. 2-4; sections 1-3; Tables corresponding to Algorithms 1-4; School of Computing and Informatics University of Louisiana at Lafayette Lafayette, LA 70504 USA; 16 pgs.

Wang, Y. et al., 'Towards Street-level Client Independent IP Geolocation', Proceeding NSDI' 11 Proceedings of the 8th USENIX conference on Networked systems design and implementation, Mar. 30-Apr. 1, 2011, Boston, MA, USA, pp. 365-379. See the whole document, particularly FIG. 2-4; sections 1-3; 14 pgs.

Marchetta, P. et al., 'Topology Discovery at the Router Level: A New Hybrid Tool Targeting ISP Networks', IEEE Journal on Selected Areas in Communications, vol. 29, No. 9, Oct. 2011. See the whole document, particularly FIG. 1-2, 4-5; sections I-IV; 12 pgs.

International Search Report and Written Opinion—PCT/AU2019/000052—ISA/EPO—dated Jul. 23, 2019; 10 pgs.

* cited by examiner

| ROUTE | ROUTE POSITION INDEX | | | | | | GEOLOCATION/ |
| --- | --- | --- | --- | --- | --- | --- | --- |
| | RA_1 | RA_2 | RA_3 | RA_4 | RA_5 | RA_6 | DEST. ADDRESS |
| ROUTE_1 | 1 | - | - | - | - | - | DA_1, P_1 |
| ROUTE_2 | 1 | - | - | - | - | - | DA_2, P_2 |
| ROUTE_3 | 1 | - | - | - | - | - | DA_3, P_3 |
| ROUTE_4 | - | 1 | - | - | - | - | DA_4, P_4 |
| ROUTE_5 | 2 | 1 | - | - | - | - | DA_5, P_5 |
| ROUTE_6 | 2 | 1 | - | - | - | - | DA_6, P_6 |
| ROUTE_7 | 2 | - | 1 | - | - | - | DA_7, P_7 |
| ROUTE_8 | 3 | 2 | 1 | - | - | - | DA_8, P_8 |
| ROUTE_9 | - | 2 | 1 | - | - | - | DA_9, P_9 |
| ROUTE_10 | 3 | - | 2 | - | - | 1 | DA_10, P_10 |
| ROUTE_11 | 5 | 4 | 3 | 2 | - | 1 | DA_11, P_11 |
| ROUTE_12 | 1 | - | - | - | - | - | DA_12, P_12 |

RA_1:

| | ROUTE | RPI | GELOCATION/DEST. ADDRESS |
|---|---|---|---|
| 504-1 → | ROUTE_1 | 1 | DA_1, P_1 |
| 504-2 → | ROUTE_2 | 1 | DA_2, P_2 |
| 504-3 → | ROUTE_3 | 1 | DA_3, P_3 |
| 504-4 → | ROUTE_5 | 2 | DA_5, P_5 |
| 504-5 → | ROUTE_6 | 2 | DA_6, P_6 |
| 504-6 → | ROUTE_7 | 2 | DA_7, P_7 |
| 504-7 → | ROUTE_8 | 3 | DA_8, P_8 |
| 504-8 → | ROUTE_10 | 3 | DA_10, P_10 |
| 504-9 → | ROUTE_11 | 5 | DA_11, P_11 |
| 504-10 → | ROUTE_12 | 1 | DA_12, P_12 |

GEOLOCATION SYSTEM AND METHOD

CROSS-REFERENCE TO RELATED APPLICATIONS

The present application is the national phase entry under 35 U.S.C. 371 of International Patent Application PCT/AU2019/000052 by Nisenblat, entitled "GEOLOCATION SYSTEM AND METHOD," filed 1 May 2019; and claims the benefit of Australian Provisional Patent Application No. 2018901459 entitled "GEOLOCATION SYSTEM AND METHOD", filed on 1 May 2018, each of which is assigned to the assignee hereof and is incorporated by reference in its entirety.

FIELD OF THE DISCLOSURE

The present disclosure relates particularly but not exclusively to systems and methods for determining a geolocation of an IP address.

BACKGROUND

The use of networked devices, such as mobile telephones, laptops, desktop computers, server devices and the like, has become prolific throughout developed countries. In some situations, it may be helpful to establish, or at least estimate, the geolocation of a networked device. For example, knowing the geolocation of a networked device associated with a user, such as a mobile phone, may allow the location of the user of the device to be inferred. This may be useful in various applications, such as, for security or safety purposes, or to deliver content to a user based on their geographic location.

Various approaches exist for determining the geolocation of a network entity within a network with differing degrees of accuracy and reliability.

One method of determining the geolocation of a network entity involves indexing a data source including a register associating Internet Protocol (IP) addresses with a physical address to retrieve the physical address as the geolocation. One example of such a register is the Regional internet Registry (RIR) whois register. A shortcoming of this approach is that it only enables retrieval of physical addresses which have been entered for particular IP addresses in the register, meaning that the physical address information associated with IP addresses for which there is no associated physical address information in the register cannot be retrieved. Furthermore, the physical address information entered in the register may be a physical address associated with the registered owner of the IP address as opposed to the physical address of the network entity which is addressable using the IP address. In other words, even in cases where physical address information is retrievable from the register, that information may not be associated with the network entity for which the geolocation is required.

Another method of determining the geolocation of a network entity involves conducting a reverse Domain Name System (DNS) lookup to determine a domain name associated with an IP Address of the entity and associating the IP Address with geolocation information associated with a physical address obtained for the DNS. Unfortunately, such geolocation techniques are unreliable since DNS records are not mandatory and not always available. Furthermore, since there is no universal rule or convention for domain naming systems available, DNS records, especially from non-English speaking countries, cannot be easily interpreted.

Yet another approach involves geolocation techniques which are not conducive to automation and thus involve manual processes. Such techniques are not readily implementable as automated processes, even if it were desirable to do so, as the information gathered is unsuitable for automation.

It would be desirable to provide a method and system which has an improved capability to geolocate IP addresses.

SUMMARY

According to a first aspect of an example of the disclosure there is provided a method of estimating a service area for a router interface, the method including:

determining hint information for indicating an association between the router interface and geolocation information obtained for one or more IP addresses serviced by the router interface; and processing the hint information to determine the service area estimation for the router interface.

In an example, determining the hint information includes:

obtaining route information for one or more routes to each of the one or more IP addresses serviced by the router interface, wherein each of the one or more route includes the router interface.

Throughout this specification references to the term "route information" are to be understood to denote information identifying one or more router interfaces servicing an access device. Furthermore, throughout this specification the term "destination IP address" will be used to refer to an IP address for which geolocation information is obtainable and which is serviced by the router interface.

In some examples, the route information may be processed to determine the hint information as a data set indicating associations between the geolocation information obtained for the IP address for each of the one or more routes and the router interface using a confidence index.

In some examples, obtaining route information for one or more routes includes obtaining route information for plural routes to the or each of the one or more IP addresses.

In one example, obtaining route information for one or more routes includes obtaining route information for more than 100 routes to each of the one or more IP addresses.

In another example, obtaining route information for one or more routes includes obtaining route information for more than 1,000 routes to the or each of the one or more IP addresses.

In still another example, obtaining route information for one or more routes includes obtaining route information for more than 10,000 routes to the or each of the one or more IP addresses.

In some example, each of the one or more routes is initiated at a different geographical location In some examples, the route information for each route includes trace route information obtained from a traceroute operation.

The geolocation information may include latitude and longitude information. In some examples, the geolocation information further includes a timestamp comprising date and time information associated with the latitude and longitude information.

In some examples, the geolocation information may include a quality indicator.

The geolocation information may be obtained from one or more data sources associating IP addresses with reliable geolocation information.

The route information for each route may include trace route information obtained from a trace route operation. In some examples, the trace route information may include an ordered ranking of intermediate router interfaces servicing the respective IP address, said ranking including the particular router interface, and wherein the confidence index includes a route position index in the form a value identifying a position of a respective intermediate router interface in the ordered ranking. In such examples, processing the route information for the set of routes including the particular router interface may include determining the route position index depending on proximity, in the ranking, to the IP address.

According to another aspect of an example of the disclosure there is provided a method of estimating a service area for a router interface, the method including:

determining geolocation information associated with each of one or more IP addresses serviced by the router interface, said geolocation information being obtained from one or more data sources associating IP addresses with reliable geolocation information;

obtaining route information for one or more routes to each of the one or more IP addresses, wherein each of the one or more routes is initiated at a different geographical location, and wherein the route information for each separate route includes an ordered ranking of intermediate router interfaces servicing the respective IP address, said ranking including the particular router interface;

processing the route information for a set of the routes including a particular router interface to provide a data set including, for each route in the set, an association between a route position index and the geolocation information associated with the IP for the route, wherein processing the route information for the set of routes including the particular router interface includes determining the route position index depending on a position of the respective intermediate router interface in the ordered ranking; and using the data set to generate a service area estimation for the particular router interface.

According to yet another aspect of an example of the disclosure there is provided a method of classifying a router interface of interest, the method including:

obtaining an index of router interfaces determined to be directly servicing the router interface of interest;

comparing a first ASN announcement including the router interface of interest with one or more other ASN announcements including a respective router interface indexed as directly servicing the router interface of interest; and classifying the router interface of interest as one of plural classification types depending on a relationship between the first ASN announcement and the one or more other ASN announcements, said classification type for indicating a relationship between the router interface of interest and the ASN of the first ASN announcement.

According to yet another aspect of an example of the disclosure there is provided a method of obtaining a service area estimation for a router interface, the method including:

determining hint information associating the router interface with geolocation information obtained for each of one or more IP addresses serviced by the router interface, wherein determining the hint information includes obtaining route information for one or more routes to each of the one or more IP addresses, wherein each of the one or more routes includes the router interface, and Wherein the route information for the one or more routes including the router interface includes, for each of the one or more IP addresses, a route position index for the router interface, said route position index depending on a proximity, in an ordered route ranking, of the router interface to the respective IP address, and wherein the route position index of each of the one or more IP addresses serviced by the router interface is associated with respective geolocation information obtained for each respective IP address to form the respective determined hint information;

processing the hint information to determine the service area estimation for the router interface, wherein determining the service area estimation for the router interface includes generating the service area estimation based on a mapping of route position index information for the router interface according the associated geolocation information.

BRIEF DESCRIPTION OF DRAWINGS

The disclosure will hereinafter be described in greater detail with reference to the attached drawings which show an example form of the disclosure. It is to be understood that the particularity of those drawings does not supersede the generality of the preceding description of the disclosure.

DETAILED DESCRIPTION

Figure 1:
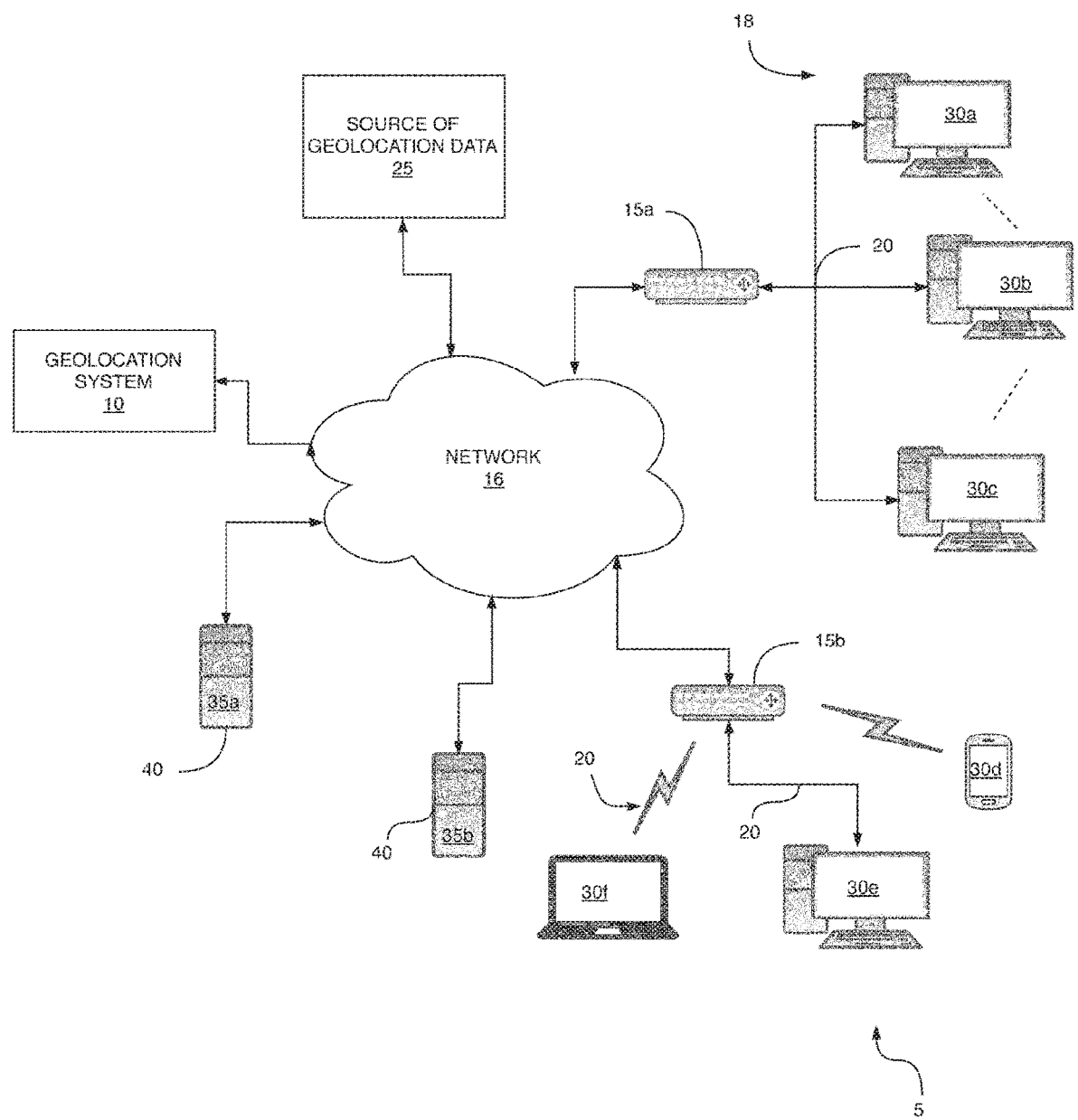
FIG. 1 is a network diagram of a network including a system for estimating the service area of a router interface according to an example.

Various systems, methods, and apparatuses are described in which geolocation information for one or more access devices having an associated IP address is used to estimate a service area for a router interface.

In one example, a system for mapping a distribution of a partial set of IP addresses serviced by a router interface is described. In various examples, the mapping system determines hint information indicating an association between geolocation information obtained for one or more IP addresses and a router interface, and then processes the hint information to determine the service area estimation for the router interface. As will be explained in more detail below, the geolocation information for one or more IP addresses may be obtained from one or more data sources indicating a geographical location of the one or more IP addresses.

The IP address may include an IPV4 or IPV6 address of an access device. In this respect, throughout this specification, references to the term "access device" are to be understood to denote a computer device having an associated internet protocol (IP) address which is addressable via the internet.

Obtaining Geolocation Information

In some examples, the geolocation information obtained for one or more IP addresses may be determined from information retrieved or otherwise obtained from any suitable data source, such as a data source associating IP addresses with information from which the geolocation information be associated, estimated, derived or inferred (such as a physical address, latitude-longitude information, regional information, country information) and thereby obtained. One example of a suitable source is a network accessible data source storing relationships between IP addresses and information from which geolocation information may be determined. For example, the data source may include information such as a whois netname and description data (which may include a physical address), a whois netname geolocation data field (if available), a whois registered organisation's physical address, self-published IP geolocation data, HTML5 geolocation API services data, or mobile location services data.

In an example, the data source may include information from which geolocation information may be directly obtained. In other words, obtaining the geolocation information may involve retrieving or otherwise obtaining information from a data source which associates IP addresses with information that provides, or which can be directly converted to, geolocation information for an access device having an IP address. In other examples, the data source may include information which may be used to associate, estimate, derive or inter geolocation information to thereby indirectly obtain geolocation information.

For example, one or more examples may be able to associate, estimate, infer or derive geolocation information for an IP address based on static location information indicating a location, place or venue at which an access device having an IP address is located (such as information identifying shopping centre, school, airport, bus stop, train station, stadium, building, a landmark, park, automatic teller machines). In such examples, the geolocation information of the access device may be obtained by retrieving or otherwise determining geolocation information associated with the static location and associating that location with the IP address of the access device. The associating of the location with the IP address in this way may involve converting the location (such as a physical address) into a co-ordinate system, such as latitude and longitude information. Examples of such access devices include networked devices such as kiosks, advertising display screens, information terminals, servers, dispensing machines (such as beverage dispensing machines, ATMs or the like. One example of a data source which may be able to associate, estimate, infer or derive geolocation information for an IP address based on static location information indicating a location is RIPE Atlas public probes data (https://atlas.ripe.net).

Furthermore, it will be appreciated that geolocation information obtained from a data source need not include static geolocation information, since in some examples dynamic location information may be determined for an access device having time-variable geolocation information (such as geolocation information associated with a access device which is moving). For example, it is possible that geolocation information may be associated, estimated, derived or inferred from an access device which is located on, for example, a vehicle having a unique identifier (for example, a flight number, a taxi number, a train number, a freight tracking number or the like), in which case, the geolocation information may be retrieved or otherwise obtained by indexing the unique identifier into a service providing dynamic location information for the vehicle accessing the access device. Again, determining the geolocation information in this way may involve converting the dynamic geolocation information into a co-ordinate system, such as latitude and longitude information. One example of a suitable data source for providing geolocation information for a flight route is a flight tracking service, such as www.flightaware.com. It is possible that the dynamic geolocation information may include real time, or near-real time, geolocation information.

In still other examples, it is possible that temporal geolocation information may be used to associate, estimate, derive or infer geolocation information and thereby obtain geolocation information. For example, one or more examples may be able to infer or derive geolocation information from an access device's interaction with a web service or a mobile application, which interaction indicates a location, place or venue at which the access device is located (such as an interaction which involves a user "checking in" to a location on Facebook. In such examples, the geolocation information of the access device may be obtained by retrieving or otherwise obtaining the temporal location information associated with the access device's interaction with a web service or a mobile application. Determining the geolocation information in this way may involve converting the temporal location information into a co-ordinate system, such as latitude and longitude information.

In still other examples, it is possible that user information for a user associated with an access device having an IP address may be used to associate, estimate, derive or infer geolocation information and thereby determine geolocation information for the access device associated with the user. For example, one or more examples may be able to infer or derive geolocation information with knowledge of the user's physical address, phone number, facsimile number, postcode, state, or country. In such examples, the geolocation information of the access device may be obtained by retrieving or otherwise obtaining the user information for the access device and then inferring or deriving the geolocation information associated with the access device from the user information. Determining the geolocation information in this way may involve converting the user information into a co-ordinate system, such as latitude and longitude information.

In still other examples, it is possible that geolocation information provided by a user associated with an access device having an IP address may be used to determine the geolocation information for the access device associated with the user. For example, one or more examples may obtain geolocation information in response to a user of the user's entering physical address, phone number, facsimile number, postcode, state, or country into the access device for communication to a device accessible to the geolocation system. In such examples, the geolocation information of the access device may be obtained by retrieving or otherwise obtaining the user provided information. Determining the geolocation information in this way may involve converting the user information into a co-ordinate system, such as latitude and longitude information.

In view of the above, it will be appreciated that examples of the disclosure may obtain various types of location information and use this information to either directly or indirectly obtain information which is indicative of the geolocation of the access device, and thus of the IP address for the access device.

As will be explained in more detail below, examples of the present disclosure may be able to process a mapping of geolocation information obtained for one or more IP addresses, and use the mapping to estimate the service area for a router interface servicing those IP addresses. In some examples, the techniques described herein may provide for accurate estimation of the geolocation of an access device based on a determination of the router interface servicing that access device and having determined an estimate of the service area for that router interface. In this respect, although the example describe below relates to the geolocation of IP addresses, it is possible that the techniques described herein may be applicable for mapping of other types of network addresses.

Data Network Arrangement

Turning now to FIG. 1 there is shown an example of a data network 5 (shown here as an Internet Protocol (IP) network) including a geolocation system 10 for estimating a service area of one or more network access points (APs) shown here as router interfaces 15 (which, in this example, comprises router interfaces 15a and 15b). As will be explained in more detail below, geolocation system 10 performs collection and analysis of "hint" information useful in generating an estimate of a service area for a router interface 15 and stores collected hint information useful for determining geolocations for specific network addresses (or blocks of network addresses) serviced by a router interface 15 for which a service area has been estimated.

Data network 5 may include a data communication network 16 such as the Internet, a local area network (LAN), a wide area network (WAN), a mobile communication network or other network. Data network 5 may include various network nodes comprising elements which enable data communication between the geolocation system 10, the access points 15, access devices 30 (which, in this example, comprises access devices 30a, 30b, 30c, 30d, 30e and 30f) and other networked devices, such as data source 25 and networked devices 40. Different types of networked devices would be well understood by a skilled reader. Examples of access devices 30 include desktop computers 30a, 30b, 30c, 30e, laptop computers 30f, tablets (not shown), mobile phones 30d, and other networked enabled access devices. In this respect, it will be understood that throughout this specification, references to the term "access device" denote a device which has access to the data network 5 for data communication.

Router interfaces 15 forward data packets between the nodes of the data network 5 and may also exchange of Border Gateway Protocol information (BGP) so as to enable the exchange routing and reachability information between autonomous systems (AS). In relation to communication of a data packet, a data packet may be forwarded from one router interface, such as router interface 15a, to one or more other router interfaces, such as router interface 15h, through the network 5 until it reaches a destination node, which may include, for example, an access device 30. When a data packet is received by a router interface 15, the router interface 15 reads network address information included in the data packet and then communicates the data packet to the next node as determined by a routing table.

In the network 5 shown, each of the one or more access devices 30 are addressable by the geolocation system 10 via one or more of the router interfaces 15 of the internet protocol (IP) network 5 via a communication link 20. Each access device 30 may communicate information with another device of the network over the network 5 via the one or more router interfaces 15 as a series of "hops" with the final "hop" involving a direct or indirect communication between a serving router interface 15 and the access device 30 over the communication link 20, which may be wired or wireless communication link.

Figure 2:
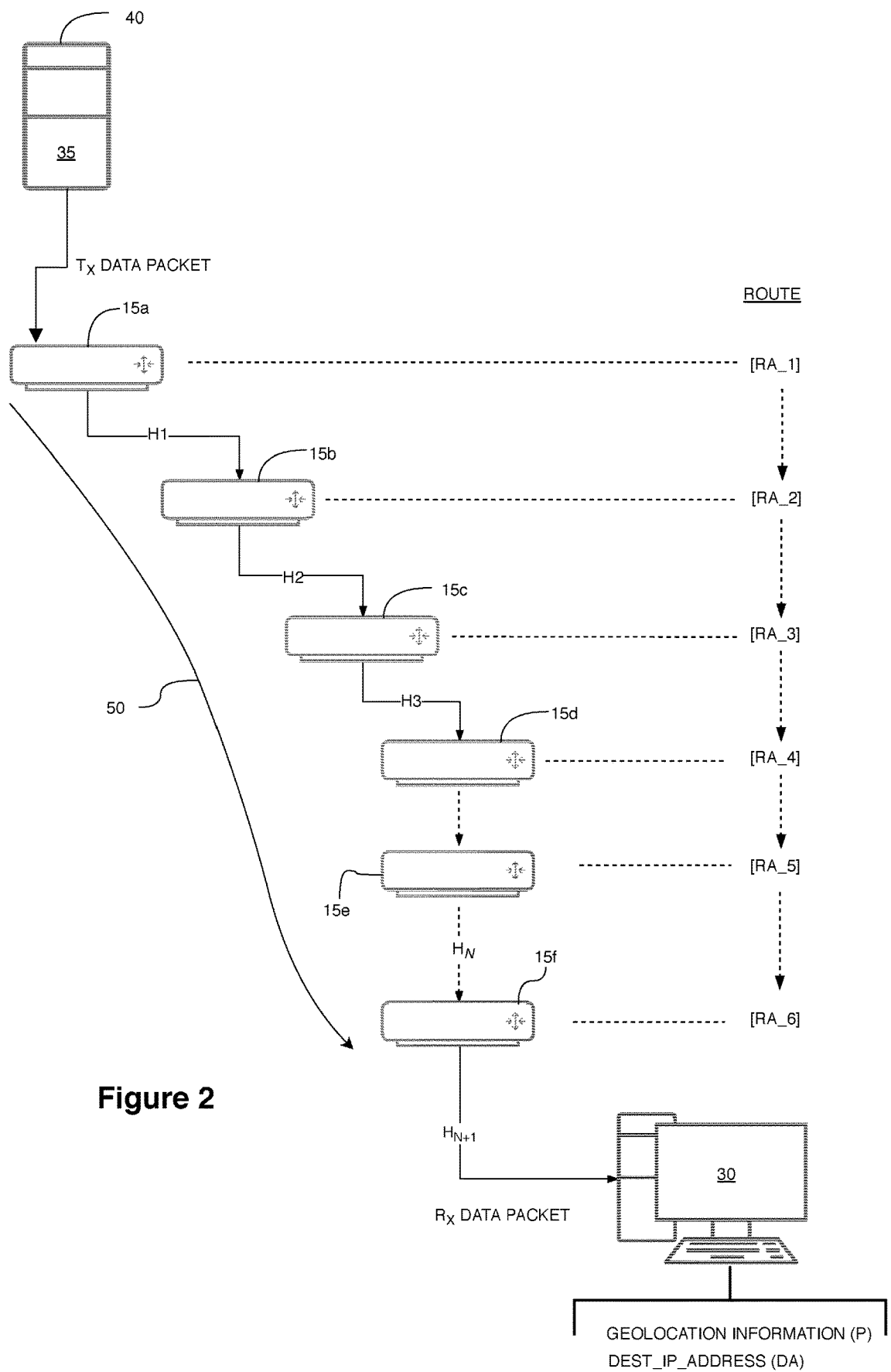
FIG. 2 shoes an example of a route between a source device and a destination device.

As shown in FIG. 2, data communication between a networked device, such as the device 40, and an access device 30 may involve communicating data packets between plural router interfaces 15a, 15b, 15c . . . 15f, with each of the router interfaces 15 providing a single instance of a "hop" (shown as "$H_n$"), and with the collection of all routers interfaces involved in the data communication between device 40 and the access device 30 forming the "path" or "route" 50.

Figure 3:
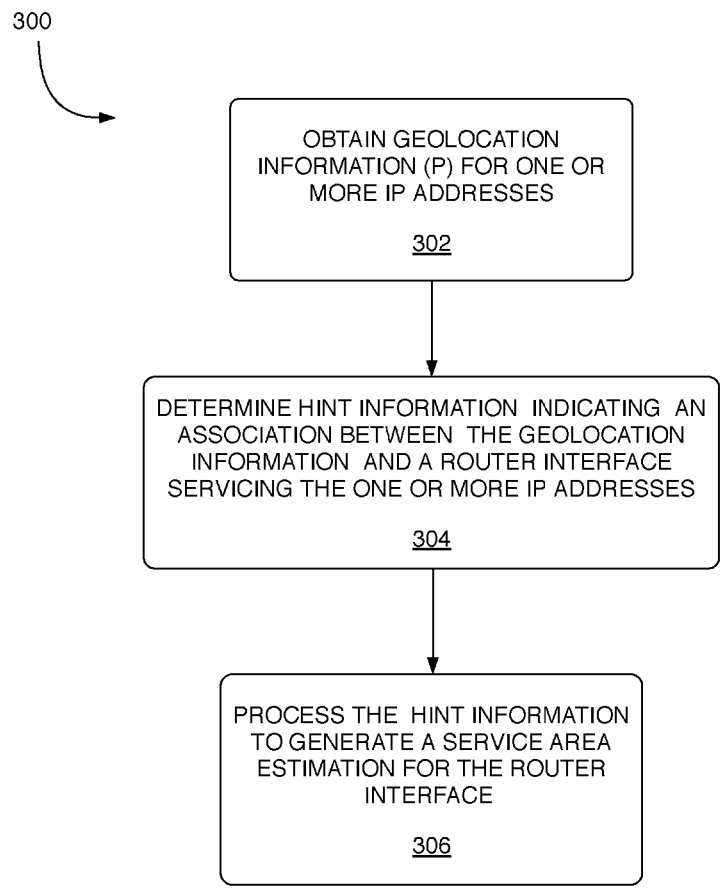
FIG. 3 is flow diagram of a method for generating an estimation of a service area of a router interface according to an example.

An example of a method for generating a service area estimation or model for a router interface 15 will now be described with reference to the flow diagram 300 depicted in FIG. 3. As shown, at 302 the geolocation system 10 shown in FIG. 1 obtains geolocation information (P) from one or more sources of geolocation data 25 and then associates that information with one or more IP address of one or more access devices 30. For the purposes of this description an IP address of an access device 30 for which geolocation information is to be determined will be referred to herein as a "destination IP address" (DA).

As explained above, various types and forms of sources of geolocation data may be used to obtain geolocation information, and different techniques may be used to associate that information with the IP address of an access device 30. Suitable techniques for associating geolocation information with an IP address would be understood by a person skilled in the art. In some examples, the geolocation data may encode the geolocation information and may include, or alternatively may be converted to, geolocation information in the form of positional information, such as latitude and longitude co-ordinate information, representing the location of the access device 30. Hence, in some examples geolocation information may be expressed as P=[Latitude, Longitude].

Determining Hint Information

At 304, the geolocation system 10 determines and/or obtains hint information for indicating an association between geolocation information obtained for one or more destination IP addresses and the router interface 15 of a router serving the access device. In the present example, determining and/or obtaining the hint information includes, but is not limited to, deriving information from route information for one or more routes taken to each of the one or more destination IP addresses associated with a respective access device 30 for which geolocation information has been determined to have an association with the respective IP address. However, it to be appreciated that different types of hint information may be derived using other methods.

In illustrated example, determining and/or obtaining hint information involves performing a conventional traceroute operation for each of one or more destination IP addresses to thereby obtain the respective route (i.e., path) of data packets across the network 5 and discover the IP addresses of the various router interfaces serving the access devices 30. With reference briefly to FIG. 2, the route 50 shown here, for example, comprises a series of interconnected intermediate router interfaces, shown here as intermediate router interfaces 15a to 15f having respective IP addresses [RA_1] . . . [RA_6]. Route 50 thus includes a sequence of plural (N+1) "hops" involving an ordered ranking of intermediate router interfaces servicing the destination IP address (DA). The final or last router interface in the route, shown here as router interface 15f, serves the access device 30 and is thus referred to as a "servicing router". The route information in this example, comprises the IP addresses [RA_1] . . . [RA_6] of the router interfaces 15a to 15f serving the access device 30 to thereby provide the route 50 and the order of those addresses.

It will be appreciated that the route 50 depicted in FIG. 2 is simply to provide an example Which assists in the description of the operation of an example of the disclosure. It is not intended the present disclosure be limited to obtaining hint information for a single route 50, nor for a route of the type or configuration shown in FIG. 2, since examples may obtain hint information for multiple routes to a destination IP address (DA). Indeed, it will be understood that multiple routes will typically exist to an access point 30 at any instance in time, including routes from different devices 40. Furthermore, it is possible that different routes to the same access device 30 may share one or more intermediate router interfaces 15 and the same device 40. Furthermore, a route may involve a different number and arrangement of intermediate router interfaces 15 to that depicted in FIG. 2, Indeed, examples may collect and process hint information for multiple routes, between multiple geographically dispersed devices 40, such as dispersed servers, and multiple access devices 30.

Figure 4:
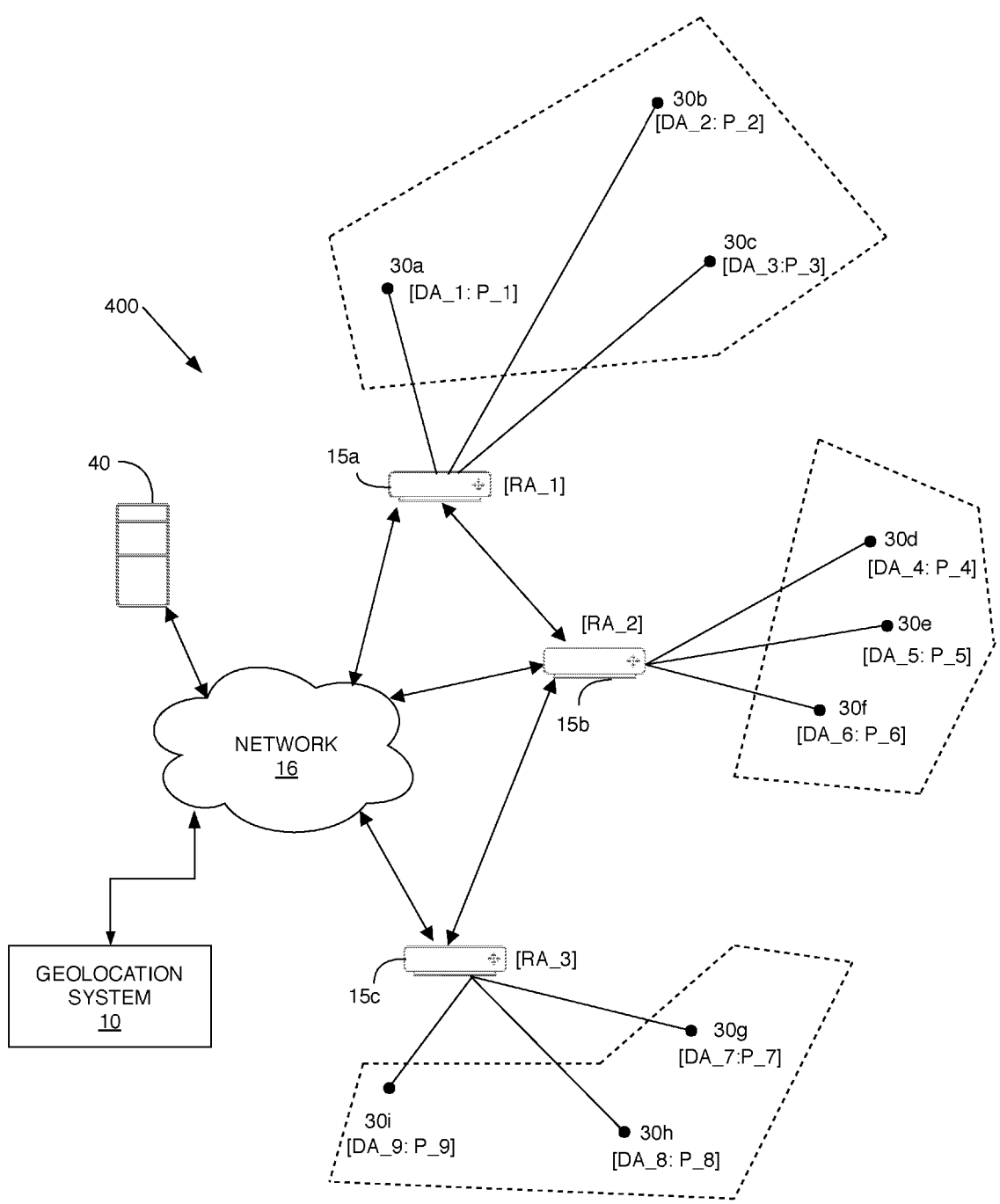
FIG. 4 is a simplified network diagram of a data communication network including plural routes.

Referring now to FIG. 4, in some examples, the geolocation system 10 obtains him information from applications, such as applications 35a, 35b (ref FIG. 1), running on plural devices 40 in the form of geographically dispersed servers (ref. FIG. 1) by conducting multiple traceroute or similar operations from those servers 40 to multiple access devices, shown here as access devices 30a to 30i, each having a respective destination IP address (DA). An advantage of obtaining hint information in this way is that it may facilitate the discovery of a larger number of router interfaces 15 serving one or more destination IP addresses from different routes. An example may thus use several servers 40 located at geographical dispersed locations around the globe to obtain hint information. For example, FIG. 4 is a network diagram depicting an example representation of a network 400 including multiple access devices 30a to 30i and multiple router interfaces 15a, 15b, 15c each having a respective IP address RA_1, RA_2, RA_3. Each access device 30a to 30i is shown to have an associated IP Address (DA) and geolocation information (P). In this example, hint information may be obtained for each of the plural routes between the server 40 and each access device 30a to 30i.

Hint information collected by server 40 is accessible to the geolocation system 10 for analysis. As will be explained in more detail below, the geolocation system 10 may implement a number of analysis techniques to associate geographic location information with an IP address (RA) of a router interface 15.

Processing Hint Information

Returning now to FIG. 3, at 306, and having obtained route information for each of the one or more destination IP addresses at step 304, the system 10 then processes the route information to form hint information for processing to determine a service area estimation for the router interface 15. In the present case, forming the hint information involves processing the route information obtained from a set of the routes including a particular router interface 15, and forming a data set including, for each route in the set, information categorising an association between the particular router interface 15 and geolocation information (P) associated with the destination IP address (DA) for the route.

Figures 5A, 5B:
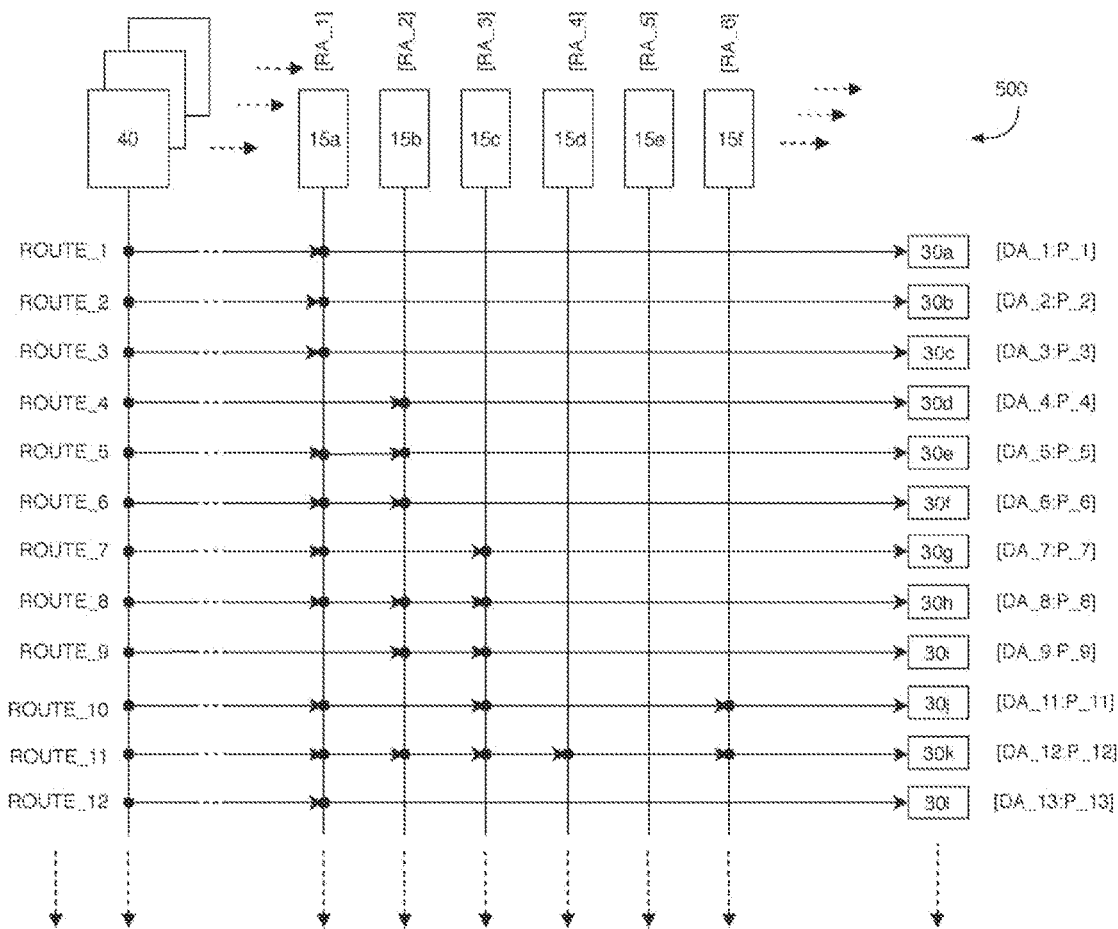
FIG. 5A is a network mesh diagram including a set of the plural routes depicted in FIG. 4.
FIG. 5B is a table including entries of route position index assignments for the set of routes depicted in FIG. 5A.

Turning now to FIG. 5A there is shown a mesh diagram 500 including route information for plural routes ROUTE_1 to ROUTE_12 between server 40 and the access devices 30a to 30i shown in FIG. 4. As shown in FIG. 5A, each route includes a single path comprising one or more of router interfaces 15a to 15f However, it is to be noted that, examples may determine that multiple individual router interfaces have appeared in multiple sets of route information, and were thus involved in delivering packets to multiple destination addresses at multiple locations (P).

In some examples, geolocation system 10 processes the obtained route information for each route, and assigns a confidence index, in the form of a route position index (RPI), to the IP address (RA) of some or all of the router interfaces 15 in the respective route (ROUTE) depending on their proximity, in the sequence, to the destination IP address (DA). In some examples, the RPI includes a value identifying a position of a respective intermediate router interface 15 in the ordered ranking of router interfaces 15 providing the route, relative to the destination address (DA) for the route. In other words, in the present case the information categorising an association between the particular router interface 15 and the geolocation information (P) associated with the destination IP (DA) for each route is the RPI information. It will of course be appreciated that other types of categorisations may be used.

With reference now to FIG. 5B, there is shown a table of example RPI assignments 502 for the set of routes represented in FIG. 5A. As shown in Figure SB, for the routes illustrated in FIG. 5A, up to the final five router interfaces 15 included in each route in the set of routes are assigned an RPI such that the final router interface 15 in the route, being the serving router interface is assigned a route position index value of "1", the next "closest" is assigned route position index value of "2", and so on. It will of course be appreciated that other indexing approaches, including approaches involving a different number of "final" router interfaces may be used.

In some examples, each RPI assignment has an associated timestamp indicating time information such as, for example, a time at which the respective route was taken and thus the "age" of the RPI, and/or the time at which the geolocation information was determined.

As is shown in FIG. 5B, in some examples route information for multiple routes is obtained to form, for each router interface 15 providing an IP address (RA) used in a route, associations between the respective RPI(s) and the geolocation information (P) for an access device 30 serviced by the respective router interface(s). Examples of the geolocation system 10 then process the route information for a set of routes including a particular router interface to provide a data set including, for each route in the set, an association between the RPI assignments for the particular router interface, such as the RPI assignments 502 for and the geolocation information associated with the destination IP for the route.

Figures 6A, 6B:
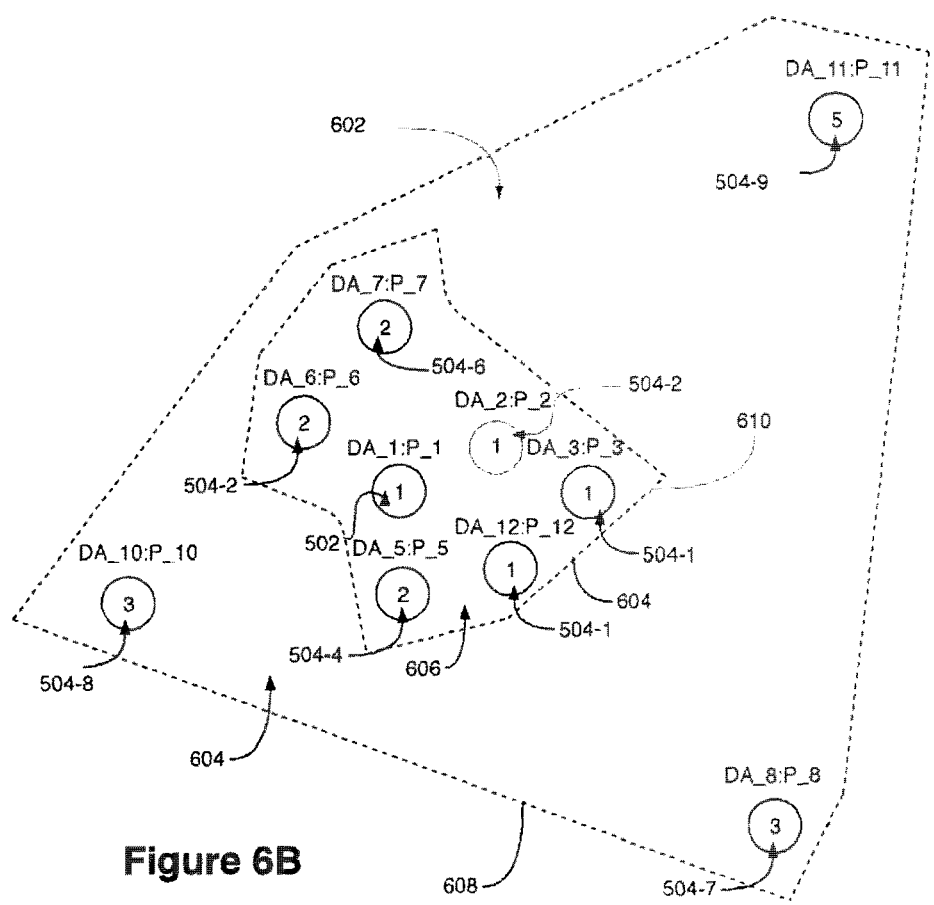
FIG. 6A is a table including route position index assignment entries for a particular router included in the table shown in FIG. 5B.
FIG. 6B is a mapping of the route assignment entries in the table shown in FIG. 6A.

FIG. 6A depicts an example table 600 including the set 504 of associations (shown here as comprising associations 504-1 to 504-10) including the corresponding RPI 502 and geolocation information 506 for each route depicted in FIG. 5A in which IP address RA_1, being the IP address for router interface 15*a*, is identified in the obtained route information. FIG. 6A thus depicts a data set 600 including, for each route in the set, associations between the RPI 502 assigned to the IP address RA_1 for the router interface 15*a*, and the geolocation information 506 associated with the destination IP address for each respective route. Although not shown in FIG. 6A, and as described previously, the geolocation information may have an associated timestamp indicating the time at which the geolocation information was determined.

In some examples, it is possible that, for a particular router interface 15 serving one or more access devices 30 at the same location (P), the route information may indicate that a particular router interface 15 was determined as the last router interface in one or more routes (e.g., RPI=1), whilst in other route information the particular router interface 15 was determined as an earlier route interface in one or more routes (e.g., RPI=2, 3, 4 or 5). In such circumstances, the particular router interface 15 is likely to be distant from, as opposed to proximate to, the particular location (P).

In some examples, and in the circumstances described above, the RPI assigned to the particular location may include the RPI value having the maximum (MAX) value of a set of RPI values determined for the particular router interface for that particular location. In other words, in some examples, a selected RPI is assigned to a geographical location to thereby obtain, for a particular router interface, a single RPI selection per location, with the single RPI selection being the RPI indicating the earliest position of the particular router interface located in a route for a particular location.

Generating a Service Area Estimation

Returning now to FIG. 3, having obtained the data set including hint information indicating an association between geolocation information obtained for one or more IP addresses of access devices 30 and a router interface 15 servicing the one or more IP addresses, examples then use the data set to generate, at step 306, a service area estimation for the router interface corresponding to the data set.

In some examples the geolocation system 10 uses hint information indicating associations between geolocation information obtained for one or more IP addresses of access devices 30 and one or more router interfaces 15 servicing the one or more IP addresses to produce a mapping of those IP addresses to estimate the service area for a particular one of the servicing router interfaces 15.

Turning now to FIG. 6B there is shown an example mapping 602 of the geolocation information determined to have the associations 504-1 to 504-10, depicted in FIG. 6A for router interface 15*a*. In the present case, mapping 602 represents a geographical distribution of the set of geolocation co-ordinates [P_1, P_2, P_3, P_4, P_5, P_6, P_7, P_8, P_10, P_11, P_12] comprising the geolocation information of the corresponding RPI for the respective association 504.

In some examples, generating the service area estimation for a particular router interface involves retrieving the data set of hint information in the form of the RPIs associated with the IP address of the router interface of interest, and applying a filter to improve the accuracy of the resultant service area estimation.

For example, the data set may be filtered according to an expiry time threshold and an RPI threshold such that RPIs having timestamp information which exceeds the expiry time threshold and which have a value which exceeds the RPI threshold are excluded from the filtered data set. Geolocation system 10 then processes the filtered data set to generate the service area estimation.

In some examples, processing the filtered data set may include processing the filtered data set to selecting a service area estimation based on:
the distribution and/or total number of RPIs assignments;
the lowest average value for the RPI assignments;
the "newest" average timestamp associated with the set of RPI assignments; and/or
the "quality" of the sources of geolocation information associated with the RPI assignments.

In other words, in some examples the shape of a service area estimation may depend on various parameters.

In the mapping 602 depicted in FIG. 6B, a first service area estimation 604 including a mapping of RPI assignments obtained by applying a first filter to the data set 602 depicted in FIG. 6A is shown as encapsulated by boundary 608, and second service area estimation 606 within the first service area estimation area 604 and including a mapping of the RPI assignments of a reduced data set obtained by applying a second filter to the data set 602 depicted in FIG. 6A is shown as encapsulated by boundary 610, with the respective first and second filters of the form:
First Filter: Exclude RPIs >3
Second Filter: Exclude RPIs >2
As shown, in this example, the second filter has the effect of excluding RPI assignments having an RPI >2.

In some examples, RPI assignments are filtered based on timestamp information associated with the RPI assignment such that RPIs which are potentially "outdated" are excluded. For example, some examples may monitor all IP address registry authorities' data using, for example, the whois public services to detect changes in ownership or restructure of a block/network and discard all the older 'hint' records, which, as a result of the changes, are likely to be outdated.

In some examples, geolocation system 10 processes the respective filtered data sets to generate the service area estimations 602, 604 as an area having a respective boundary 606, 608 determined according to the distribution of RPI assignments 502 of each respective filtered data set. Different techniques for determining a boundary would be well understood to a skilled person.

Geolocation System

A more detailed discussion of the functionality of a geolocation processing system according to an example of the disclosure will now be described with reference to the system 10 depicted in FIG. 7 and the method 800 of FIG. 8.

Figure 7:
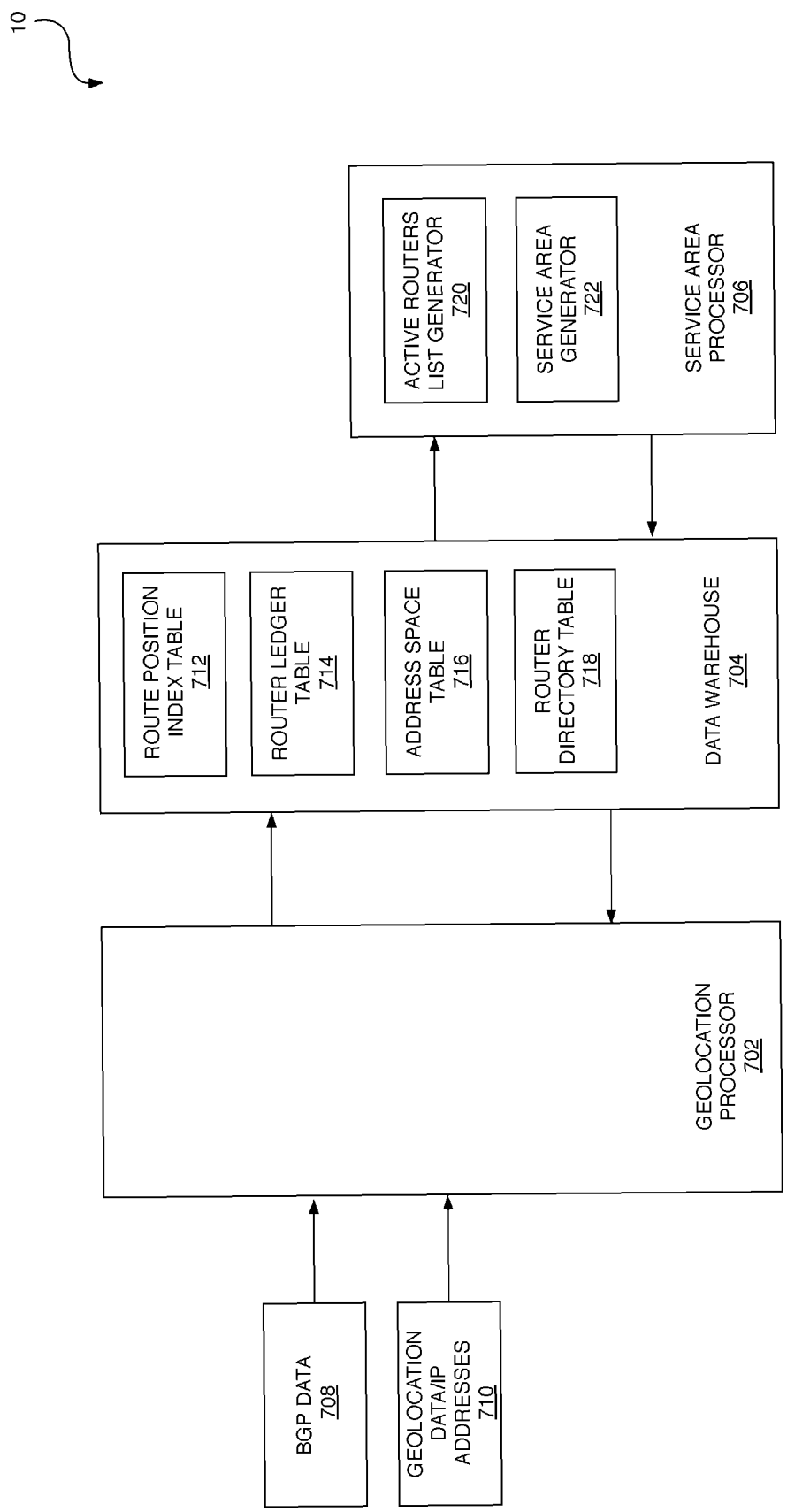
FIG. 7 is a functional block diagram of a geolocation system according to an example.

Turning initially to FIG. 7 there is shown a block diagram of a geolocation processing system 10 according to an example. As shown, the geolocation system 10 includes geolocation processor 702, data warehouse 704, and service area processor 706.

As will be explained in more detail below, in the illustrated example geolocation processor 702 receives and/or determines border gateway protocol data 708 and associations between geolocation information and IP addresses 710 associated with one or more access devices 30, so as to determine and/or update hint information for processing by the service area processor 706 to generate a service area estimation for a particular router interface.

Figure 8:
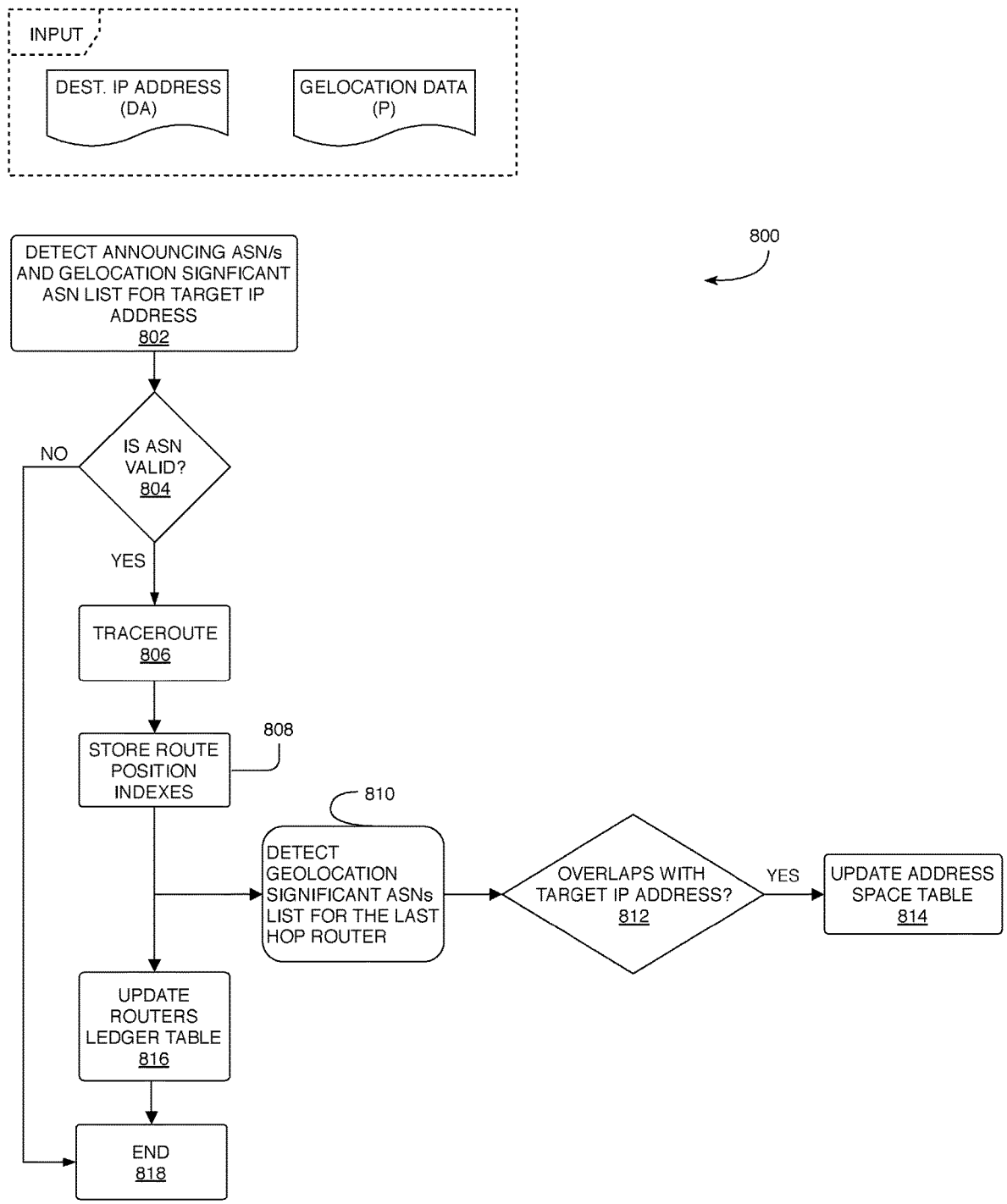
FIG. 8 is a flow diagram of a method of processing border gateway protocol (BGP) data and associations between geolocation information and IP addresses.
Figure 9:
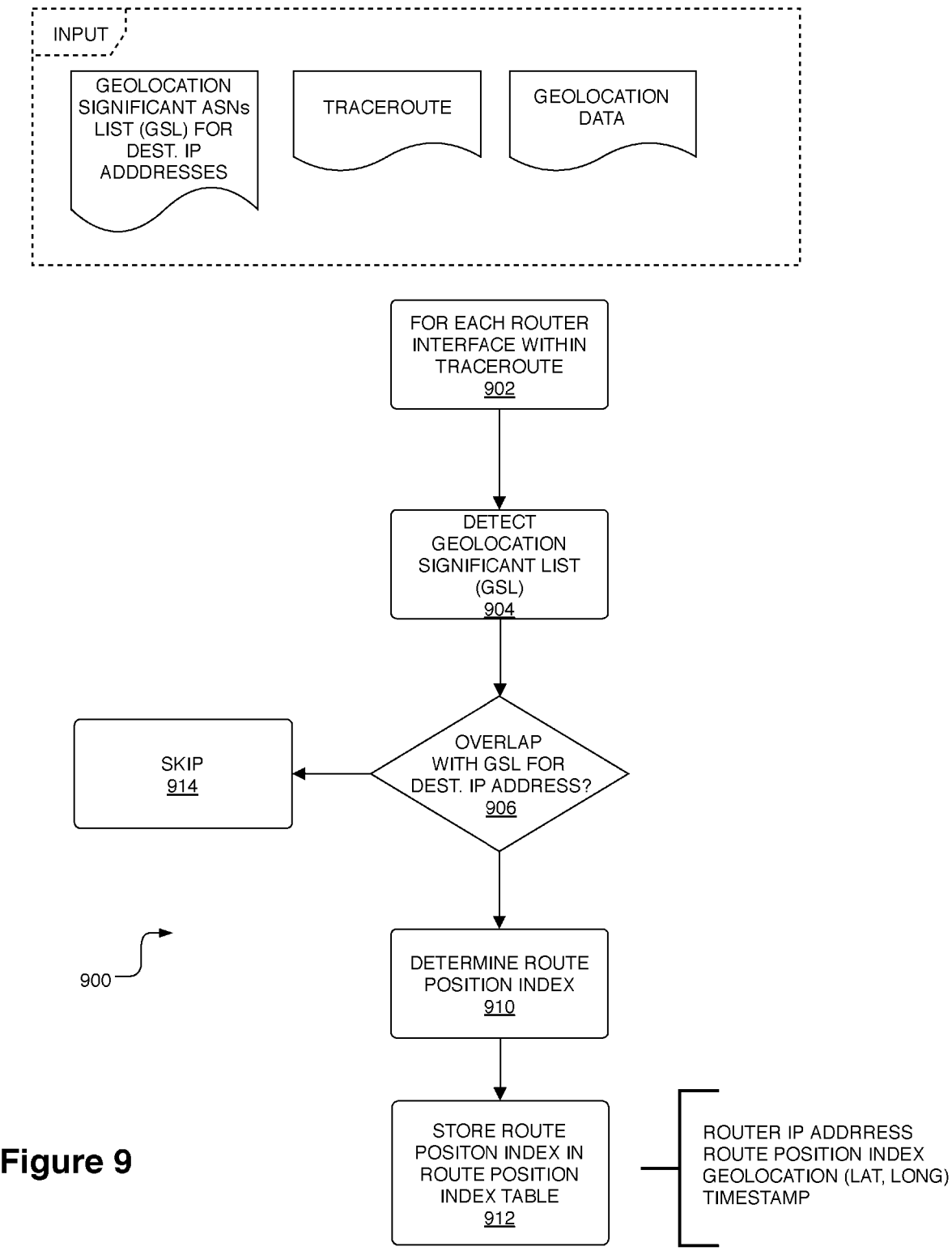
FIG. 9 is a flow diagram of an example method for determining a route position index for a router interface.

One approach processing the border gateway protocol data 708 and associations between geolocation information (P) and a single IP address (DA) 710 is shown in FIG. 8 and FIG. 9. In this respect, although the description that follows relates to the processing of a single IP address, (DA) it is to be noted that method 800 could be used to process a single address or alternatively a consecutive block of IP addresses (say 256 addresses for example) using the same logic if sharing the same geolocation information. For example, by taking one or more single IP address samples at block start, end and middle points, the method 800 may declare an entire block as likely residing at the same geographical location and serviced by the same router interface if the final hop router interface identified in the route information. In this way, the method 800 can replicate the results to all block inclusive addresses. This approach may reduce the number of actual traceroutes performed.

Method 800 includes checking an input destination IP (DA) address against BGP routing data 708 (ref. FIG. 7) to confirm that the destination IP address is addressable.

As will be understood. BGP data comprises a chain of ASN "hops" that should be travelled by a data packet to a destination IP network destination. In some examples, checking a destination IP (DA) address against BGP routing data involves detecting 802 a global set of ASN announcements and confirming 804 that the destination IP address is within a range announced by an ASN and thus is valid. By way of an example, a typical BGP announcement may be of the general form:

IP Address Range: X.X.X.0-X.X.X.255
ASN path: A=>B=>C=>D.

Accordingly, in this example IP Address Range X.X.X.0-X.X.X.255 is "announced" by ASN 'D' (i.e., the last ASN on the path) with the previous ASN being ASN 'C'. In some examples, the final hop and the second to last "hop" in each BGP announcement are determined to be "geographically significant ASNs" in that they are likely to be geographically closer to the access device having the destination IP address. The significance of "geographically significant ASNs" will be described later.

If a destination IP address or a range is not present completely in the global BGP routing data 702, meaning that it is not announced in a BGP announcement, that destination IP address is considered not reachable. In the event that a destination IP address is determined to be not reachable, no further processing of that address occurs and the process concludes at 818.

In the event that a valid ASN range is found (that is, an ASN having an associated range of IP addresses which includes the destination IP address), at 806 traceroutes operations are conducted to identify active intermediate router interfaces taking part in serving the destination IP address. As a part of this step, the IP address (RA) of the final router interface is stored as the "serving router" and that router interface, and one or more of the intermediate router interfaces identified in the route, are assigned an RPI (ref. FIG. 9, step 910) as described previously. RPI assignments, and potentially other information, is then stored or updated at 808 in Route Position Index Table 712 (ref. FIG. 7). As shown in FIG. 9, one processes for determining and storing an RPI in a route position index table may involve, for each router interface in the route, indexing 904 a list of geolocation significant ASNs and determining 906 whether an overlap exists with the destination IP address.

In particular, at 810, a list of "geographically significant ASNs" are detected for the IP Address of the "serving router" (RAS) using the same technique described above with reference to step 802.

Once detected, the list of geographically significant ASNs detected for the serving router are compared, at step 812, with the corresponding list of geographically significant ASNs detected for the destination IP address to confirm whether the serving router interface likely has a geographical proximity for servicing the destination IP address. In the event that a valid confirmation is made (in other words, if the respective lists of geographically significant ASNs overlap), the destination IP address (DA), the serving router interface IP address (RAS) and a route timestamp are stored in address space table 716 (ref. FIG. 7).

At step 816, IP address and the corresponding RPI information is stored or updated, at step 816, in a Router Ledger Table 714 (ref. FIG. 7) for all "last hop" router interfaces found worldwide leading or directly servicing each of the routers interfaces detected. In other words, in some examples, for every network addressable router interface included in route information, regardless of if its position within a route, a record is kept of the router interface (IP address) directly service the router interface (i.e., the "hop peer") on the same traceroute and its RPI as the offset to the main router interface RPI. In some examples, and as will be explained in more detail below, storing information for all network addressable router interfaces, together with their previous "hop peers" may allow router interfaces to be "categorised" as one of plural different router interface types with reasonable confidence.

Figure 10:
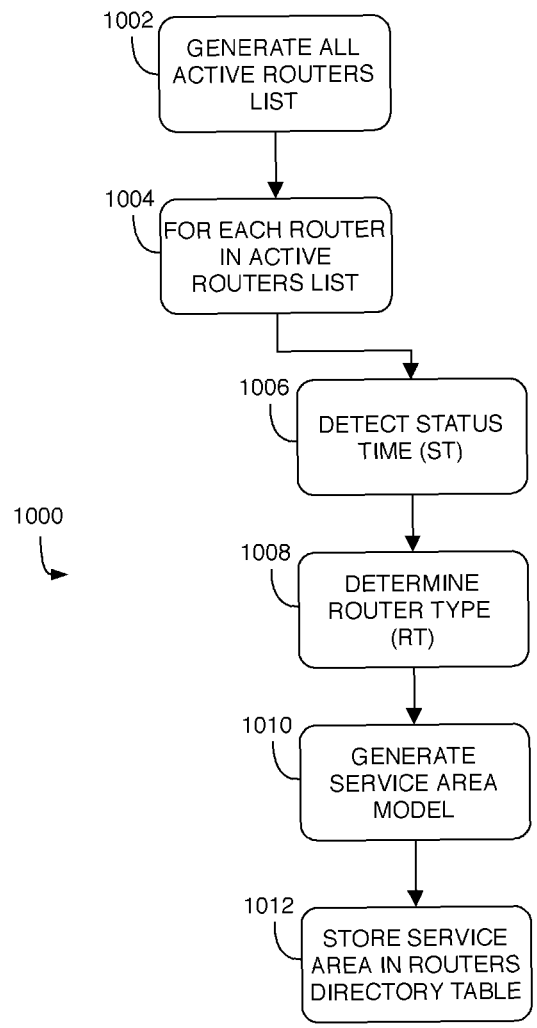
FIG. 10 is a flow diagram of an example method for generating a Routers Directory Table for use with an example.

Turning now to FIG. 10 there is shown a flow diagram of an example method 1000 for generating a Routers Directory Table 718 (ref. FIG. 7) storing (at least) updated service area estimations for each router interface detected by examples.

As shown, the depicted method 1000 involves constructing, at step 1002, an index of all IP addresses detected for router interfaces as an "active routers index" (ARI). The ARI may be constructed, for example, by combining all unique IP address entries included in Routers Ledger Table 714. At step 1004, for each IP address in the ARI the method then detects, at 1006, a "status time" being the last known time from which when any change in the network is likely to affect the IP address of interest. In this respect, in some examples the "status time" may be determined as the latest timestamp out of:

The last change in the BGP announcement such as a geographically significant list changed time, announced by ASN or the block size changes etc; and/or The latest whois data record actual change.

Returning again to FIG. 8, at step 816, IP address and the corresponding RPI information is stored or updated in a Router Ledger Table 714 for all "last hop" router interfaces found worldwide leading or directly servicing each of the routers interfaces detected.

In some examples, as shown in FIG. 10, each router interface is classified, at step 1008, as one or more of the following router interface types (RT):

An edge or multifunctional router (for example, router interfaces with border access to an ASN that can receive traffic from other ASNs);

A Core router (for example, an internal router interface within an ASN which receives traffic from the same ASN only); and/or A Location router (that is, a last hop router serving access devices).

In some examples, classifying each router interface may involve

Generating an index of all last hop router interfaces serving directly the router interface of interest (for example, by obtaining the index of the last hop IP addresses from Routers Ledger Table 714, filtered by "status time");

Checking wherever the announced ASN list for each last hop router overlaps with the announced ASN list for the router of interest;

If all overlaps—that indicates that the router of interest is receiving traffic from within the same ASN only, so it must be a "Core' otherwise it should be of the type of "edge" or "multifunctional" router; and If the router of interest is of a 'Core' type but it is always at the end of a trace route—and never appears in the last hop IP address field list, we mark this as a "Location" router.

It is to be noted that since "location" routers may only be serving a limited address space, and only directly, it is likely that it will be much harder to collect their direct "hints". For example, if a particular router interface is only serving a few tens of IP addresses within a small organisation, and geolocation information from that particular IP address space is not available, it is possible that no RPI assignments can be determined for the router interface. In such circumstances, some examples may assume that the particular router interface is likely to be proximate to or within the service area of its closest "upstream" router interface(s), and obtain and combine RPI assignments associated with its "one hop away" peers and then estimate the most likely service area the router interface is serving based on that information.

At step 1010, the service area estimation is then generated and stored in the Routers Directory Table 718 (ref. FIG. 7).

Figure 11:
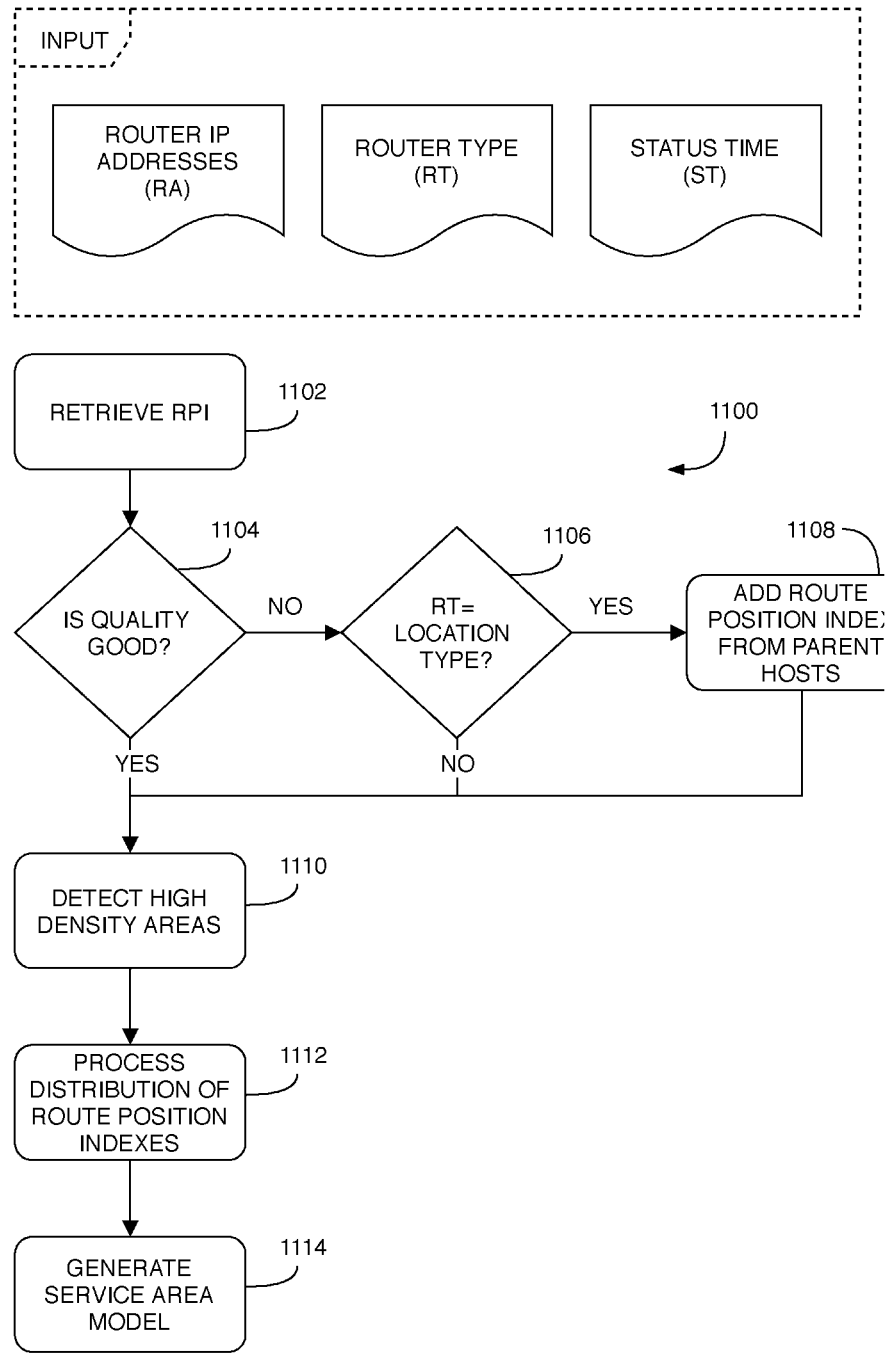
FIG. 11 is a flow diagram of an example method for generating a service area estimation for a router interface according to an example.

FIG. 11 shows a flow diagram 1100 of an example method for generating the service area estimation for a router interface by service area generator 702.

As shown, method 1100 involves querying Route Position Index Table to retrieve 1102 RPI assignments stored for the router interface IP address of interest. As explained previously, the retrieved RPI assignments may be filtered by "status time", aggregated by RPI, and grouped by geolocation on the basis of an RPI value which is lower than a threshold value.

An example of a suitable pseudocode SQL statement for selecting an RPI assignment for a particular router interface and a particular location is as follows:

SELECT IPAddress, MAX(RPI) as Confidence, Latitude, Longitude
  FROM RoutePositionIndexTable
  WHERE IPAddress=@RouterAddress and TimeStamp>@StatusTime
  GROUP BY IPAddress, Latitude, Longitude
  HAVING MAX(RPI)<5
  ORDER BY MAX(RPI), TimeStamp desc In some examples, the quality of the grouped RPIs is assessed against quality parameters such as the number of RPIs in the group, date ranges of the RPIs in the group, and one or more confidence indexes.

In some examples, if it is determined at 1108 that a router interface of interest is of type "location type", then it may be assumed that core routers directly associated with the router interface of interest are likely in the same geographical area, and the RPI of the core router(s) is added to the group at step 1108.

Having formed a data set comprising a group of RPI and geolocation assignments for a particular router interfaces, at steps 1110 to 1114 the service area estimation for that router interface may be generated.

In some examples, a service area estimation may be generated as a "mapping" of a partial set of selected RPI assignments for a particular router interface, as described previously with reference to FIG. 6B.

Figure 12:
FIG. 12 is an example of a mapping of route position index assignments for a router interface.

In preference, the selected RPI assignments depend on, for example, a threshold RPI value (noting that, in the described example a lower RPI is better). Ideally, all the selected RPI assignments would comprise RPI=1. However, this is not always possible. In some examples, RPI assignment selections may depend on quality factors, such as data source type or data accuracy indicators. FIG. 12 is an example mapping of RPI assignments showing a distribution of RPI assignments having an RPI less than a threshold value.

Having obtained a mapping of RPI assignments, examples then determine a service area estimation using a suitable technique. One example of a suitable technique is a heat map.

Determining Geolocation Information for an Access Device

Figure 13:
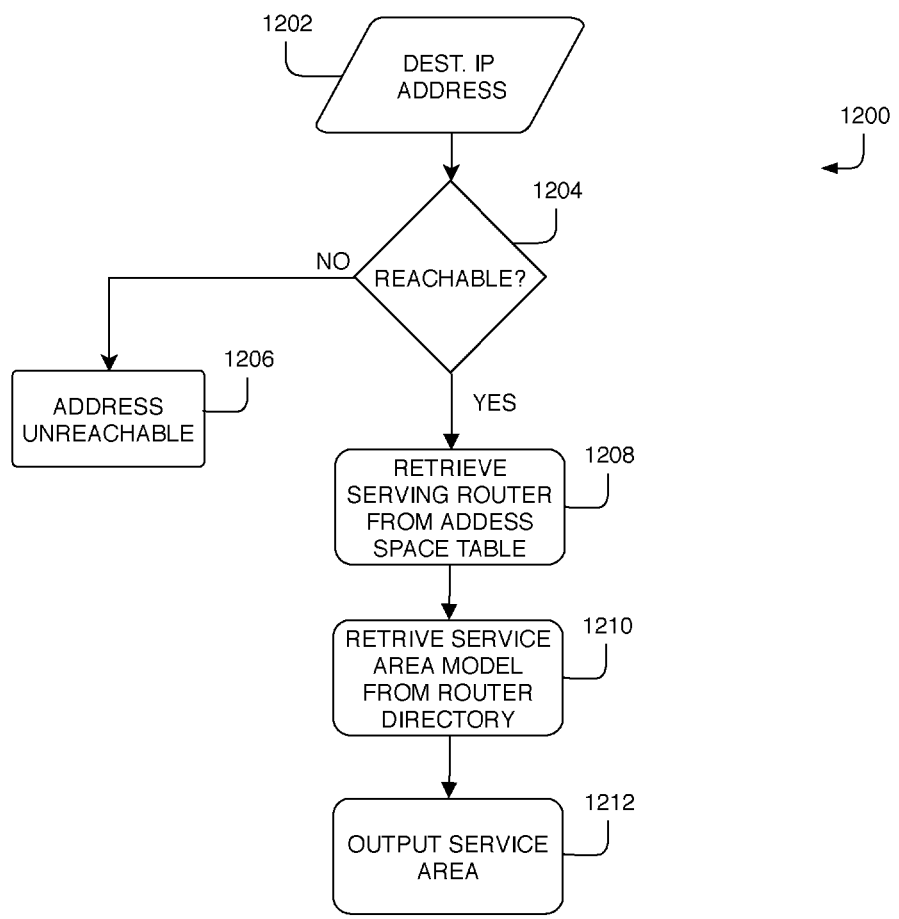
FIG. 13 is a flow diagram of a method of determining an estimate of a geolocation of an access device.

A service area estimation for a router interface generated by an example may be used to determine an estimate of the geolocation of an access device having an associated destination IP address. One method 1200 for estimating the geolocation of an access device is shown in FIG. 13.

As shown, the method 1200 involves determining 1204 whether the destination address 1202 is reachable by a network, and, in the event that the address is reachable, retrieving 1208 from the Address Space Table 716 (ref. FIG. 7), the IP address of the router interface for the particular router interface serving the destination IP address 1202. Having established the IP address of the particular router interface 1202, the service area generated for the particular router interface is then retrieved from the Router Directory Table 718 (ref FIG. 7). The service area estimation of the particular router interface is then considered as the geolocation estimate of the access device.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the examples disclosed herein may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted that the various methods described in flowcharts are just one implementation and that the operations of those methods may be rearranged or otherwise modified such that other implementations are possible.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The steps of a method or algorithm described in connection with the examples disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM, a Blu-ray disc, or any other form of computer readable medium. In some aspects, the computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media. In another aspect, the computer readable medium may be integral to the processor. The processor and the computer readable medium may reside in an ASIC or related device. The software codes may be stored in a memory unit and the processor may be configured to execute them. The memory unit may be implemented within the processor or external to the processor, in which case it can be communicatively coupled to the processor via various means as is known in the art.

Further, it should be appreciated that modules and/or other appropriate means for performing the methods and techniques described herein can be downloaded and/or otherwise obtained by computing device. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a computing device can obtain the various methods upon coupling or providing the storage means to the device. Moreover, any other suitable technique for providing the methods and techniques described herein to a device can be utilized.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application described. Neither is the present disclosure restricted in its preferred example with regard to the particular elements and/or features described or depicted herein. It will be appreciated that the disclosure is not limited to the example or examples disclosed, but is capable of numerous rearrangements, modifications and substitutions without departing from the scope of the disclosure as set forth and defined by the following claims.

What is claimed is:

1. A method of obtaining a service area estimation for a router interface, the method including:
    obtaining route information for each route of plural routes including the router interface and a destination IP address serviced by the router interface, each respective destination IP address having associated known geolocation information;
    processing, using one or more processors, the route information to determine, for each route, a route position index identifying a position of the router interface in the route relative to the respective destination IP address of the route; and
    one or more of the processors processing a set of the route position indexes and, for each route position index of the set, the known geolocation information associated with the respective destination IP address used for the determination of the respective route position index, to determine the service area estimation for the router interface, wherein the service area estimation for the router interface is determined as a data set modeling an area having a boundary which is based at least in part on the known geolocation information associated with each route position index of the set of plural route position indexes, and wherein the set of route position indexes only includes route position indexes having a value which is less than a threshold value.

2. The method according to claim 1 wherein the route information for each route further includes a time-stamp indicating a time at which the respective route was obtained.

3. The method according to claim 1 wherein at least one route of the plural routes is initiated at a different geographical location.

4. The method according to claim 1, wherein the known geolocation information includes known latitude and longitude information for a device having the respective destination IP address.

5. The method according to claim 4, wherein the known geolocation information further includes a timestamp comprising date and time information associated with the known latitude and longitude information.

6. The method according to claim 5, wherein the known geolocation information further includes a quality indicator depending on the timestamp.

7. The method according to claim 1, wherein the known geolocation information for each destination IP addresses serviced by the router interface is obtained from one or more data sources associating IP addresses with reliable geolocation information.

8. The method according to claim 1, wherein the route information for each at least one route is obtained from a trace route operation.

9. The method according to claim 8, wherein the route information includes an ordered ranking of intermediate router interfaces servicing a respective destination IP address, the ordered ranking identifying the relative position of each respective intermediate router interface in the respective route relative to the respective destination IP address targeted by the route, said ranking including the router interface, and wherein the route position index is a value identifying the position of the router interface in the ordered ranking.

10. The method according to claim 9, wherein each route position index identifying a position of the router interface in a respective route relative to the respective destination IP address is associated with the respective geolocation information obtained for each respective IP address.

11. The method according to claim 9, further including: determining the service area estimation for the router interface includes generating the service area estimation as a diagrammatic representation of route position indexes according to the associated geolocation information.

12. The method according to claim 1, wherein the route information for each route comprises a ranking of router interfaces servicing the respective destination IP, said router interfaces including the router interface and one or more other router interfaces, said ranking having an order which depends on the position of the router interfaces in the route relative to the destination IP address targeted by the respective route, and wherein the position of the router interface in at least one route identified by the route position index is the position of the router interface in the ranking.

13. The method according to claim 1, further including: identifying the router interface servicing the respective destination IP address; and retrieving the service area estimation for the identified router interface.

14. The method according to claim 1, further including:
obtaining an index of router interfaces determined to be directly servicing the router interface;
comparing a first ASN announcement including the router interface with one or more other ASN announcements including a respective router interface indexed as directly servicing the router interface; and
classifying the router interface as one of a plurality of classification types depending on a relationship between the first ASN announcement and the one or more other ASN announcements, said classification type for indicating a relationship between the router interface and the ASN of the first ASN announcement.

15. A system for obtaining a service area estimation for a router interface, the system including:
one or more processors;
a non-transitory computer readable medium storing a set of program instructions accessible to the one or more processors;
wherein the set of program instructions is executable by the one or more processors to:
obtain route information for each route of plural routes including the router interface and a respective destination IP address serviced by the router interface, each respective destination IP address having known geolocation information;
process the route information to determine, for each route, a route position index identifying a position of the router interface in the route relative to the respective destination IP address; and
process, for each route of a set of the plural routes, the respective route position index and the known geolocation information for the respective destination IP addresses to determine the service area estimation for the router interface, wherein the service area estimation for the router interface is determined as a data set modeling an area having a boundary which is based at least in part on the known geolocation information associated with each route position index of the set of plural route position indexes, and wherein the set of route position indexes only includes route position indexes having a value which is less than a threshold value.

* * * * *